United States Patent [19]
Nowak et al.

[11] 3,813,174
[45] May 28, 1974

[54] OPTICAL AMMUNITION INSPECTION SYSTEM AND METHOD

[75] Inventors: Matthew Nowak, Passic; Gus George Tirellis, Scranton, both of N.J.

[73] Assignee: The United States of America as represented by the Secretary of the Army, Washington, D.C.

[22] Filed: Mar. 30, 1973

[21] Appl. No.: 346,506

[52] U.S. Cl............... 356/241, 86/1 R, 356/256
[51] Int. Cl....................... G01n 21/16, G01n 21/32
[58] Field of Search ........ 86/1 R; 356/51, 241, 256; 250/337, 361–369, 458, 459, 461–467, 483–488

[56] References Cited
UNITED STATES PATENTS
2,541,976   2/1951   Bogart .......................... 356/241 X

*Primary Examiner*—Ronald L. Wibert
*Assistant Examiner*—F. L. Evans
*Attorney, Agent, or Firm*—Edward J. Kelly; Herbert Berl; Thomas R. Webb

[57] ABSTRACT

A mortar projectile, having a long narrow flash passage leading to an ignition cartridge, is inspected for obstructions at the junction between the cartridge and the passage by reflecting an ultraviolet beam, by means of a dichroic beamslitter, through the flash passage to a photo-luminescent coating on the adjacent end of the cartridge. The ultraviolet beam excites the coating to produce visible light which passes back through the flash passage and the same beamsplitter to a detector, such as a photocell or photomultiplier tube. The ultraviolet radiation source includes a broad-band glow lamp or xenon flash tube and an ultraviolet filter and a second dichroic beamsplitter for filtering out most of the visible light. The inspection apparatus also includes a converging quartz lens and a plurality of lens stop apertures for focusing and collimating the ultraviolet beam to a small diameter at the photo-luminescent coating, a green light filter in front of the photomultiplier, and an automatic shutter for shielding the photomultiplier when not in use.

11 Claims, 5 Drawing Figures

OPTICAL AMMUNITION INSPECTION SYSTEM AND METHOD

BACKGROUND OF THE INVENTION

At least one type of mortar ammunition round comprises a projectile having a tapered rear body portion formed with primer recess at the rear end and an ignition cartridge chamber at the forward end, connected by a long narrow flash passage.

Radial passages extend from the cartridge chamber through the projectile body to permit the cartridge flames to ignite propellant charges attached to the outside of the projectile, when the cartridge is ignited by flames from the primer through the flash passage. In waterproofing to improve the dependability of the round, the ignition cartridge is enveloped in a mylar foil and sealed in its chamber by a suitable cement. Dispensing machines are used in production lines to automatically dispense the cement into the chamber. Sometimes, the cement flows into the communicating flash passage, partially or completely blocking the latter, thus interfering with the ignition of the cartridge. Since the flash passage is only about one-eighth inch in diameter and is about 3 inches long, it is impossible to reliably determine whether or not the flash passage is obstructed by simple visual inspection of the hole before the primer is installed. It has been suggested that the projectile be inspected by: coating the adjacent end of the cartridge, before sealing into its chamber, with photo-luminescent material; irradiating the coating through the flash passage with ultraviolet radiation; and detecting the visible light emitted by the coating. However, this suggestion did not provide a practical means (or method) for introducing the ultraviolet radiation and detecting the resultant visible light.

SUMMARY OF THE INVENTION

In accordance with the present invention, a long narrow flash passage to an ignition element of an explosive projectile is inspected for obstructions by generating an ultraviolet beam along a first beam path, reflecting the beam along a second beam path intersecting the first path and extending through the flash passage to a photo-luminescent coating on the end of the ignition element, by means of a dichroic beamsplitter, and detecting a beam of visible light emitted by the coating back along the second path and through the beamsplitter. In a preferred embodiment, the radiation source emits both ultraviolet and visible radiation, and most of the visible radiation is filtered out by means of an ultraviolet filter and a second dichroic beamsplitter position along the first path. Preferably, a predetermined area of the end of the ignition element is coated and the amount or intensity of the visible green light emitted is measured by means of a photomultiplier and a green light fiter. A quartz lens and two or more lens stop apertures may be used to focus and collimate the ultraviolet beam.

DETAILED DESCRIPTION OF PREFERRED EMBODIMENTS

Figure 1:
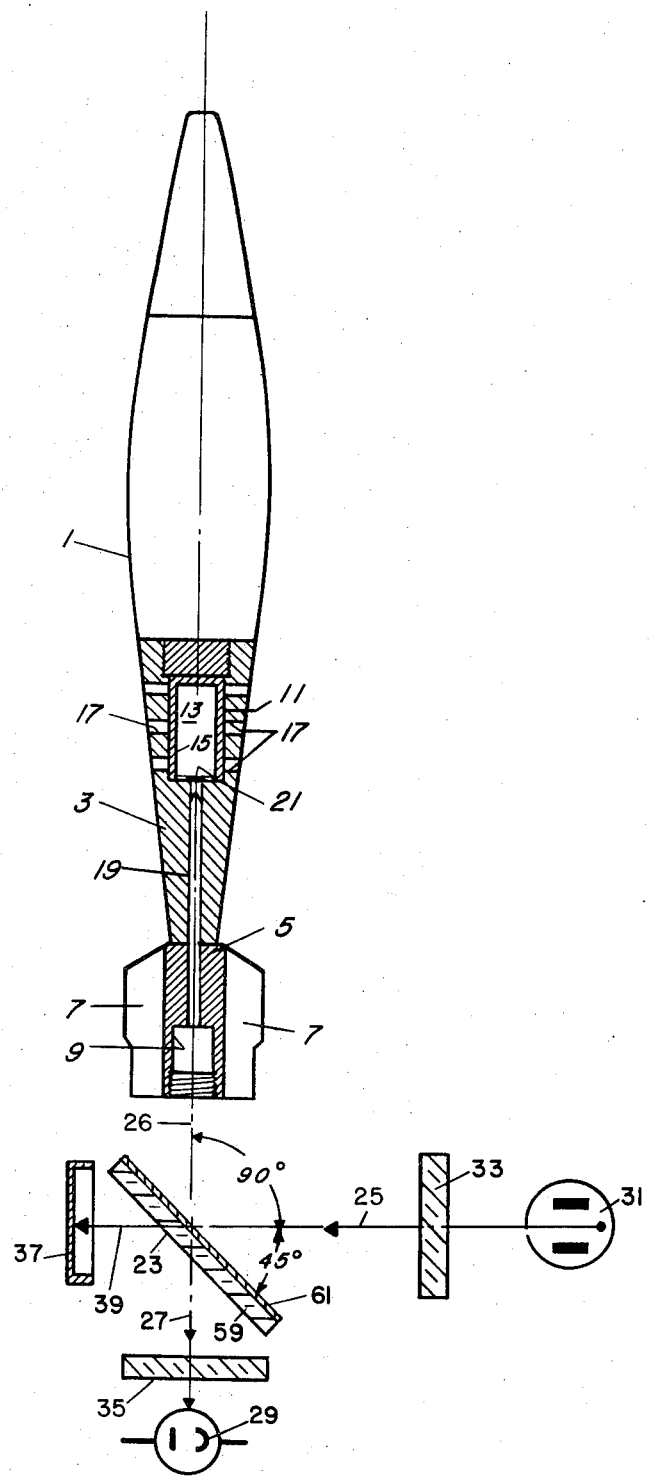
FIG. 1 is an axial sectional view of the mortar shell and associated equipment embodying the invention.

Referring to FIG. 1, the invention is illustrated, for example, as applied to an 81 mm. mortar projectile 1, comprising a tapered rear body section 3 having a cylindrical fin extension 5, which may be attached to or integral with the section 3. A plurality of stabilizing fins 7 are attached to the outside of the extension 5. The rear end of extension 5 is formed with an axial recess or bore 9 for housing a conventional primer (not shown). The forward end of section 3 is formed with an axial chamber or recess 11 containing an ignition element or cartridge 13 having a mylar foil enclosure 15. The chamber 11 is connected to the exterior of the projectile by a plurality of vent holes or passages 17, to permit the gas flames from the ignited cartridge 13 to ignite the usual propellant bags (not shown) attached to the outside of the projectile 1. The primer recess 9 and cartridge chamber 11 are connected by a long narrow axial flash or flame passage 19 which is formed in the section 3 and extension 5. During assembly of the projectile, the end of cartridge 13 abutting and closing the flash passage 19 is sealed to the adjacent shoulder surrounding the passage by a suitable cement (not shown). This cement is applied in fluid condition and may flow into and at least partially block the passages 19, thus preventing or reducing the reliability of ignition of the cartridge 13 by flames from the primer in recess 9.

In accordance with the present invention, at least a portion of the end area of cartridge 13 closing the passage 19 is provided, prior to assembly into the chamber 11, with a coating 21 of photo-luminescent material, e.g., a yellow light emitting phosphor as used in fluorescent screens of black-and-white cathode ray tubes, and, after assembly and sealing of the cartridge 13 in the recess, the flash passage 19 is inspected for obstructions by use of a dichroic beamsplitter 23 for reflecting a beam of ultraviolet radiation, from a first path 25 to a second path 26, through the recess 9 and flash passage 19 to the photo-luminescent coating 21, and for transmitting a beam of visible (e.g., yellow) light emitted by the coating along a third path 27 to a detector 29, such as a photocell. The dichroic beamsplitter 23 is designed to be a good reflector of ultraviolet radiation and a poor reflector of visible light. It is also a good transmitter of visible light and a poor transmitter of ultraviolet. Therefore, as used in FIG. 1, the element 23 not only directs the ultraviolet beam into the flash passage and the visible beam (27) to the detector, but also filters out a large part of the visible light in the ultraviolet beam (25). For this reason, the source of the ultraviolet beam (25–26) need not be a pure ultraviolet source. Satisfactory results can be obtained with a beam (25) derived from a radiation source made up of a broad-band glow discharge tube or lamp 31 and an ultraviolet (transmitting) filter 33, as shown in FIG. 1.

Preferably, the incident and reflected beam paths 25 and 26 should be substantially perpendicular, and the reflecting surface of the beamsplitter 23 should be oriented substantially at a 45° angle to each beam path, as shown, but this is not critical. A monochromatic filter 35, e.g. green light transmitting, may be positioned between the beamsplitter 23 and the detector 29. Also, a trap 37 may be positioned behind the beamsplitter 23 to trap the relatively small portion of the radiation of incident beam (25) which passes through the beamsplitter 23 substantially along path 39. The various elements are mounted in the fixed positions shown in FIG. 1 by suitable means which will be obvious to those skilled in the art.

Figure 2:
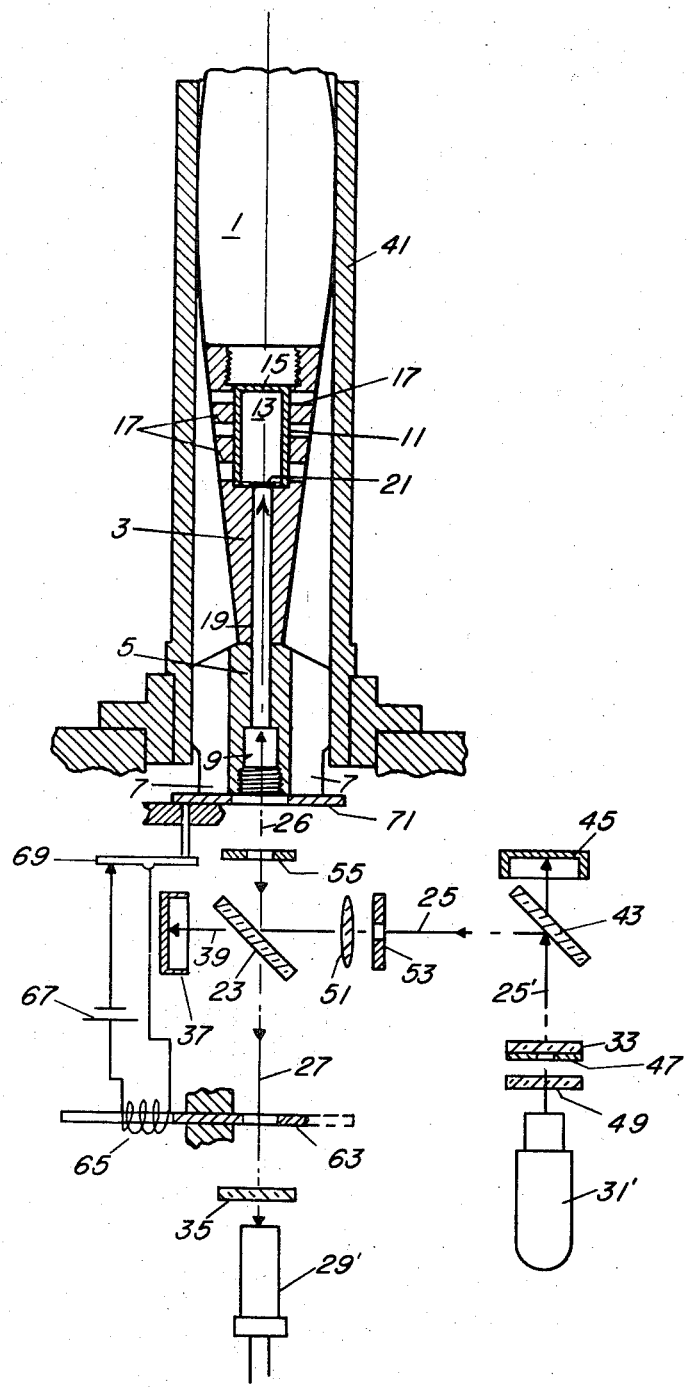
FIG. 2 is a view similar to FIG. 1 of a more elaborate emodiment of the invention.

FIG. 2 shows a more elaborate system, involving the invention, which is now used in the manufacture of 81 mm. mortar ammunition. The same numerals used in FIGS. 1 and 2 refer to substantially identical elements. In FIG. 2, the projectile 1 is shown as being slidably mounted within a support tube 41, which simulates the launch tube in which the projectile will be subsequently launched. The radiation source 31 of FIG. 1 is replaced by a pulsed Xenon flash tube 31' oriented along a path 25' substantially at right angles to the incident path 25, and a second dichroic beamsplitter 43 is positioned at the intersection of paths 25 and 25', to reflect the beam from path 25' to path 25, and to filter out still more of the visible light from the flash tube 31'. A trap 45 may be positioned behind the beamsplitter 43 to trap the radiation passing through that beamsplitter.

The radiating area of the flash tube 31' is a narrow rectangle not completely stationary from pulse to pulse. This area, when focused without correction on the coating 21 would produce a non-uniform and non-stationary image. This undesirable result is eliminated by positioning a plate 47 having a small circular aperture, e.g., about 0.125 inch in diameter, and a diffusing ground quartz plate or disc 49 in front of the tube 31', as shown in FIG. 2. A double-convex converging quartz lens 51 and two (or more) plates 53 and 55, each having a small circular aperture, are suitably positioned along the beam paths 25 and 26, for focusing and collimating the ultraviolet beam to a fine pencil-like beam having a diameter, at the coating 21, of about 0.160 inch, only slightly larger than that (0.120) of the flash passage 19. Aperture plate    , in front of the lens 51, serves essentially as a lens stop and as a baffle to minimize stray radiation, and aperture plate 55 (e.g., 0.170 inch aperture), between the beamsplitter 23 and the flash passage 19, serves as an actual stop for the lens 51.

The sensitive photomultiplier 29' in FIG. 2 may be protected when not in use by an apertured shutter 63, slidably mounted in the path 27 and actuated by a solenoid 65 connected in series with a battery 67 and a switch 69. Switch 69 is automatically closed by engagement of the rear end of the projectile with a movable plate 71 when the projectile is loaded into the muzzle of the support tube 41.

The dichroid beamsplitter 23 of FIGS. 1 and 2 (and also the beamsplitter 43 of FIG. 2) may, for example, be a flat plate 59 of fused silica (glass), which has an index of refraction of about 1.5, having a thickness of about one-eighth inch, suitable shape and size, and an ultraviolet-reflecting dielectric coating 61 on the surface of the plate facing the ultraviolet source. The coating 61 may comprise a single film of a dielectric material having a higher refractive index than the plate 59, such as ZnS or $TiO_2$, of optical thickness $\lambda/4$ at a wavelength $\lambda$ in the ultraviolet band at which maximum reflectance is desired, or an odd member of $\lambda/4$ films of alternate high and low reractive index, such as ZnS:2.3 and crylolite;1.3, respectively, as described on pages 215–221 of "Optical Properties of Thin Solid Films," by O. S. Heavens, Academic Press, Inc., New York, N.Y. 1955. These films may be deposited by known methods, including the methods described on pages 6–23 and 217 of the same reference. For example, films of $TiO_2$ may be formed by exposing the glass surface to the vapor from $TiCl_4$. The ultraviolet filter 33 may be a Corning C.S. No. 7-54 filter; and the green filter 35 may be a Corning C.S. No. 4-64 filter. The potomultiplier may be an RCA-931A type.

Figure 3:
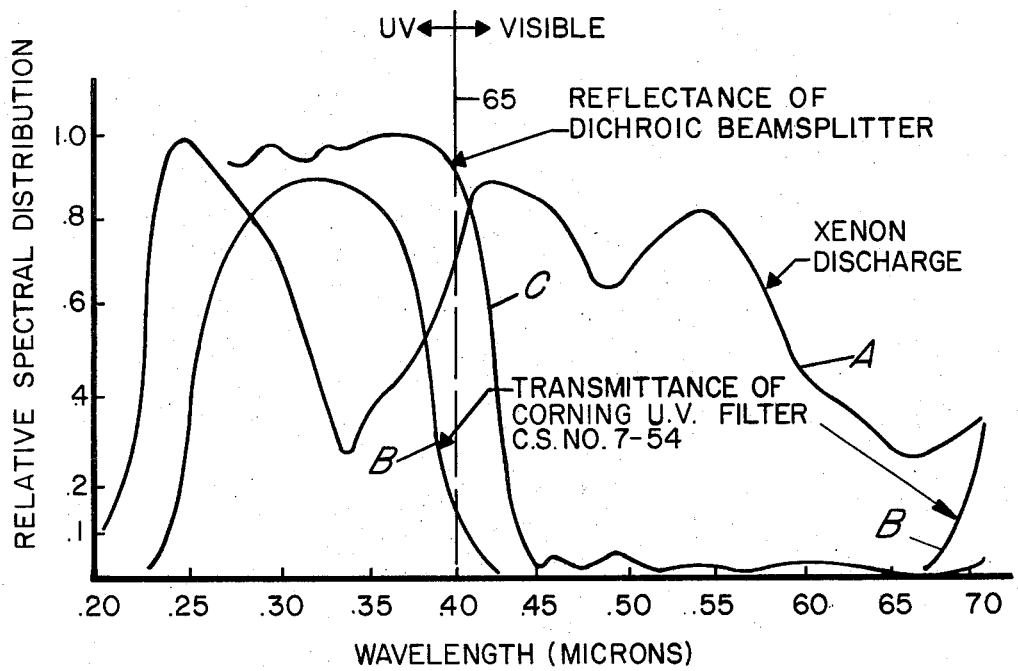
FIG. 3 is a graph shwing the relative spectral distribution of a Xenon discharge lamp, a UV filter, and the reflectance of a dichroic beamsplitter.

FIG. 3 shows the relative spectral distributions of (1) the Xenon lamp 31', curve A; (2) the Corning ultraviolet filter 33, curve B; and the dichroic beamsplitter 23 as a reflector, curve C. A vertical dashed line 65 at 0.4 microns (4,000 A) indicates the generally accepted upper limit of the ultraviolet band and lower limit of the visible band. Curves A and B show that the Xenon lamp emits both visible and ultraviolet radiation, but the ultraviolet filter 33 transmits less than 10 percent of the visible as compared to nearly 90 percent of the ultraviolet. Curve C shows that the dichroic beamsplitter 23 reflects nearly all (about 97 percent) of the ultraviolet as compard to about 10 percent of the visible.

Figure 4:
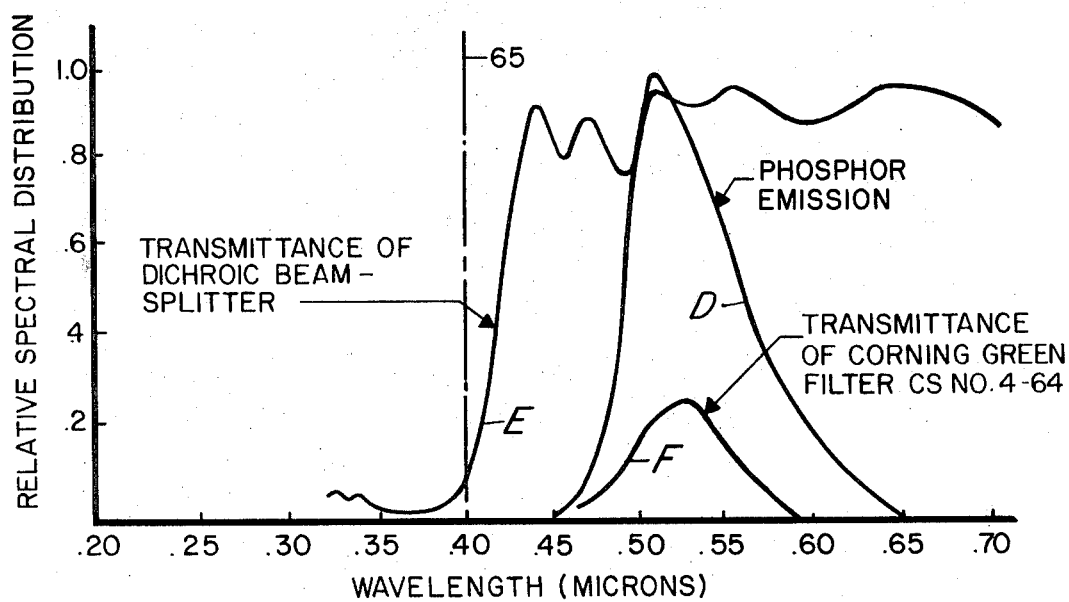
FIG. 4 is a graph showing the spectral distribution of a photo-luminescent phosphor, a green light filter, and the transmittance of the beamsplitter.

FIG. 4 shows the relative spectral distributions of: (1) the photo-luminescent phosphor coating 21, curve D; (2) the dichroic beamsplitter 23 as a transmitter, curve E; and (3) the Corning green filter 35, curve F. Curves D and E show that about 90 percent of the phosphor emission is transmitted through the beamsplitter 23. Curve F shows that the green filter 35 limits the light reaching the photomultiplier 29' to predominantly green (0.50 to 0.57 microns). Curve E also shows that very little (not more than about 3 percent) of the ultraviolet radiation is transmitted by each of the dichroic beamsplitters 23 and 43. In the example given above for FIG. 4, assuming equal distribution of visible and ultraviolet emitted by the Xenon lamp 31', the approximate percentages of viible and ultraviolet radiation along the several beam paths are shown in the following table:

| Path No. | Ultraviolet | Visible |
|---|---|---|
| (lamp) | 50 | 50 |
| 25' | 45 | 5 |
| 25 | 43.15 | .5 |
| 26 | 41.85 | .05 (reflected) |

The percentage of visible light emitted by the phosphor 21 back along path 26 would be 41.85 percent × Ep, the efficiency of the phosphor for conversion of ultraviolet to visible radiation along path 26. This would be reduced by the beamsplitter 23 to 37.67 × Ep along path 27.

Figure 5:
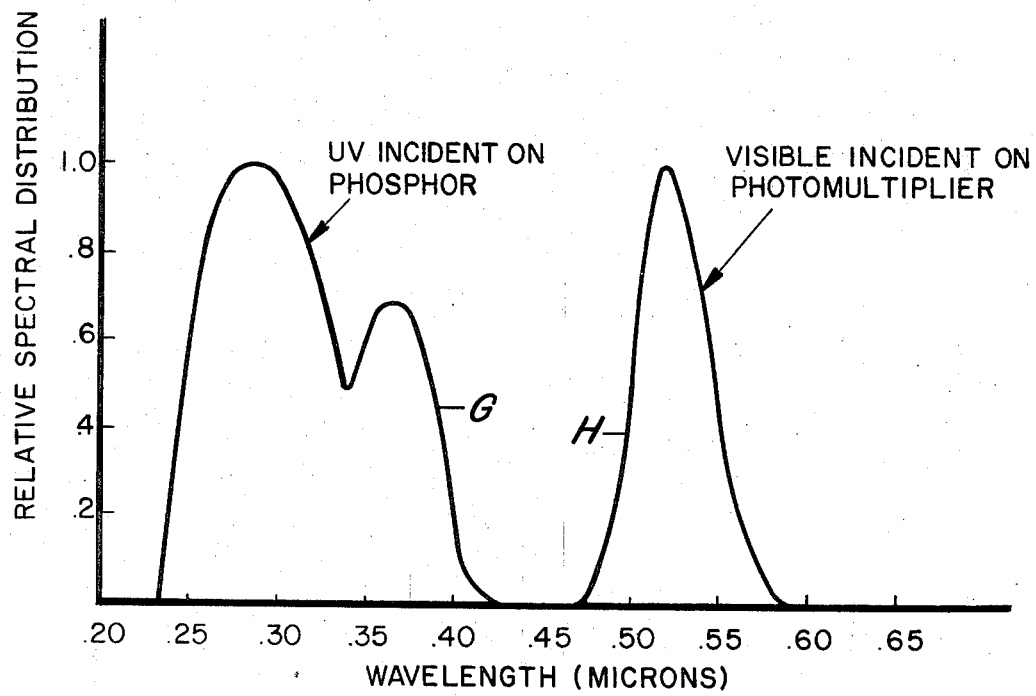
FIG. 5 is a graph showing the relative spectral distribution of the ultraviolet radiation incident on the phosphor and the visible light incident on a photomultiplier.

FIG. 5 shows the spectral isolation of the ultraviolet excitation radiation, curve G, and the visible light incident on the photomultiplier 31', curve H. Preferably, the entire (predetermined) area of the end of the cartridge 13' exposed to the flash passage 21 is uniformly coated (21) with phosphor, in which case the output of the photomultiplier 31' is substantially directly proportional to the unobstructed area of the flash passage. Thus, in the inspection of mortar ammunition in the factory, projectiles producing an output below a predetermined level are automatically rejected.

The term "dichroic beamsplitter" as used in the specification and claims is intended to mean an element or member that is constructed and arranged to split a beam of incident radiant energy into a predominantly ultraviolet reflected beam and a predominantly visible transmitted beam.

We wish it to be understood that we do not desire to be limited to the exact method and detail of construction described for obvious modification will occur to persons skilled in the art.

We claim:

1. An optical inspection system comprising:
   a. a projectile having a long narrow flash passage closed at one end by an ignition element and open at the other end during inspection;
   b. a coating of photo-luminescent material on at least a portion of the surface of said ignition element exposed to said passage;
   c. a source of ultraviolet radiation spaced from said flash passage;
   d. means including a dichroic beamsplitter aligned with said passage, for directing a beam of ultraviolet radiation from said source through said passage to said coating, to cause said coating to emit visible light;
   e. a light detector spaced from said beamsplitter; and
   f. means, including said beamsplitter, for directing a beam of visible light from said coating, through said beamsplitter, to said light detector.

2. A system as in claim 1, wherein said source of ultraviolet radiation comprises a lamp which emits ultraviolet and visible radiation, and an ultraviolet transmitting filter interposed between said lamp and said beamsplitter.

3. A system as in claim 1, wherein the second-named means further includes a green light transmitting filter interposed between said beamsplitter and said detector.

4. A system as in claim 1, wherein the first-named means further includes a second dichroic beamsplitter interposed between said source and the first-named beamsplitter.

5. A system as in claim 4, wherein each of said beamsplitters is a flat plate of fused silica having an ultraviolet-reflecting dielectric coating on the surface thereof facing said source.

6. A system as in claim 1, wherein said coating covers a predetermined area of said surface of said ignition element, and said detector comprises a photomultiplier for measuring the intensity of said visible light beam.

7. A system as in claim 1, wherein the first-named means further includes a converging quartz lens and a plurality of aperture plates spaced along the ultraviolet beam path between said source and said beam flash passage, for focusing and collimating said beam to a diameter at said coating approximately equal to the diameter of said flash passage.

8. A system as in claim 7, wherein said source includes a pulsed electric lamp, and a ground quartz plate and a plate having a circular aperture adjacent to said mid lamp, for producing a uniform circular image on said coating.

9. A system as in claim 1, wherein said projectile is an elongated mortar shell having an axial flash passage of small diameter opening at said one end into a chamber of larger diameter containing said ignition element, with one end thereof sealed to an annular wall of said chamber surrounding said passage, said coating being located on said one end of said element.

10. A method of inspecting a projectile having a long narrow passage closed at one end by an ignition element and open at the other end during inspecion, comprising the steps of:
    a. coating at least a portion of the surface of said ignition element exposed to said passage with photo-luminescent material;
    b. generating a beam of ultraviolet radiation along a first beam path;
    c. reflecting said ultraviolet beam along a second beam path intersecting said first path and extending through said passage to said coating by means of a dichroic beamsplitter; and
    d. detecting a beam of visible light emitted by said coating back along said second beam path and through said beamsplitter.

11. A method as in claim 10, wherein step (b) includes the steps of:
    1. generating a beam of ultraviolet and visible radiation; and
    2. fitering most of the visible radiation from said beam by means of an ultraviolet transmitting filter and a second dichroic beamsplitter positioned along said first beam path.

* * * * *